UNITED STATES PATENT OFFICE.

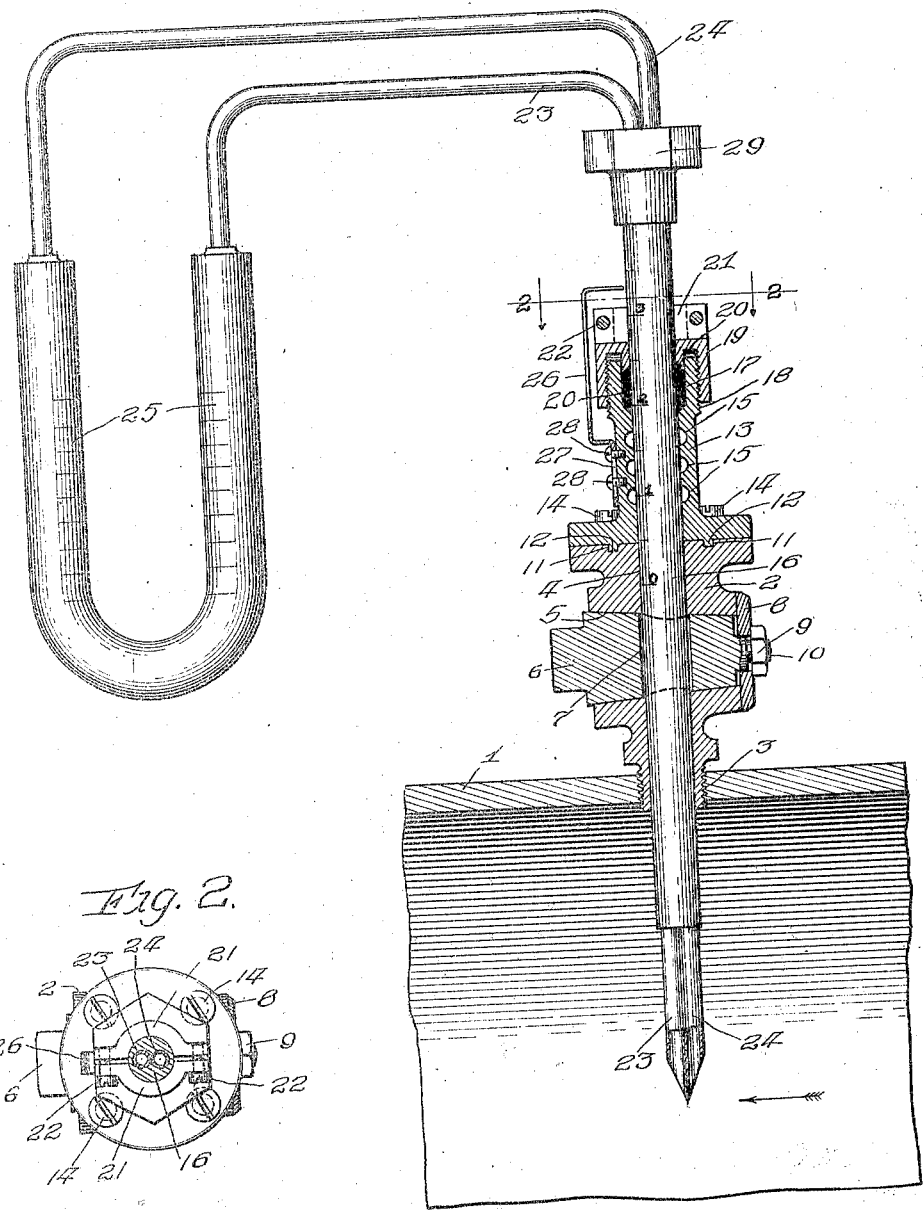

LESTER F. LOHNES, OF RIVERSIDE, ILLINOIS.

ADJUSTABLE AND REMOVABLE PITOT TUBE.

1,295,046.   Specification of Letters Patent.   Patented Feb. 18, 1919.

Application filed July 8, 1918. Serial No. 243,832.

*To all whom it may concern:*

Be it known that I, LESTER F. LOHNES, a citizen of the United States, residing at Riverside, in the county of Cook and State of Illinois, have invented certain new and useful Improvements in Adjustable and Removable Pitot Tubes, of which the following is a specification.

This invention relates to a differential pressure tube which is designed and intended to be inserted in a fluid conduit for indicating the pressure difference or flow of fluid therein.

The principal object of the invention is to provide a device of this kind which is adjustable for traversing a cross-section of the conduit, and is also removable so that it can be used at different places, and also so that it can be easily cleaned, and kept clean.

Other objects will appear hereinafter.

In the accompanying drawing—Figure 1 is a side view partly in section of a tube constructed in accordance with the principles of this invention and diagrammatically shown as being connected to an indicating U-tube; and Fig. 2 is a section taken on line 2—2 of Fig. 1.

It is found that where a tube of this kind is left continuously in a pipe or conduit there is apt to be an accumulation of dirt, such as grease and oil, from live steam or gas, or scales and sediments, such as lime, from live steam or water pipes. It is a distinct advantage therefore to have a removable Pitot tube which can be inserted at will for measuring the flow and applied at different points, if desired. The device has also another distinct advantage, which is for experimental purposes, where it is desired to measure and compare the difference in pressure or flow at different points transversely of the conduit in which the Pitot tube is inserted.

The present invention is intended to be used in any pipe or conduit 1 in which a fluid is flowing, such for example, as a steam, gas or water pipe. A cock 2 has a threaded stem 3 which is inserted through the wall of the pipe 1, and this cock has a longitudinal bore 4 extending through the stem 3 and through the opposite end of the cock. In a tapered opening 5, extending transversely of the bore 4, a valve 6 is seated, having an opening 7 adapted to be moved into or out of register with the bore 4 of the cock, and this valve is held tightly in the opening by means of a washer 8 at the smaller end of the opening 5, and a nut 9 is threaded on a protruding stem 10 of the valve 6.

At the outer end of the cock 2 is a groove 11 in which a corresponding projection 12 of a fitting 13 is inserted to make a fluid-tight connection with the cock, and these parts are fastened together by screws 14, or other suitable fastening means. This member 13 also has a central perforation to register with the bore 4 and a plurality of inside pressure equalizing grooves 15 for preventing a local action of leakage along a tube 16, which is insertible through the member 13, through the bore 4 of the cock and the opening 7 of the valve 6, when the valve is turned in the proper direction until the inner end of the tube 16 projects within the pipe 1.

At the outer end of the member 13 is an enlarged space 17 on the inside surrounding the tube 16 and a threaded external surface 18 upon which a packing gland 19 is threaded for tightening the packing 20 against the tube 16. The outer end of the gland 19 is formed with a split collar 21, the portions of which may be clamped tightly about the tube by means of screws 22 for holding the tube in any adjusted position.

Inside of the tube 16 are static and dynamic tubes 23 and 24 which project from the inner end of the tube 16 where they are beveled in opposite directions, as clearly shown in Fig. 1, to receive the direct impulse of fluid flowing in the pipe 1. These tubes 23 and 24 are connected to the opposite ends of a differential pressure device, such as a U-tube 25, for indicating the difference in pressure or the flow of fluid in the pipe 1. This, of course, is only a diagrammatic arrangement of the indicating means to show the application of the Pitot tube. It will be evident that the tube 16 can be entirely withdrawn from the pipe 1 without loss of pressure or the escape of fluid through the valve 6 or the cock 2, for by having the member 13 sufficiently long, the inner ends of the tubes 23 and 24, which are inserted within the pipe 1, may be withdrawn from the pipe until the inclined ends are beyond the valve 6, whereupon it may be turned and the bore 4 therethrough closed. When removing the tube 16 in this manner, the gland 19 and packing 20 maintain a fluid-tight connection between the tube 16 and the member 13, and after the valve 6 is closed, the Pitot tube can be entirely removed from the fitting 13, and if desired, the fitting itself may be disconnected from the cock 2 by disengaging the fastening devices 14.

In order to indicate the position of the inclined ends of the tubes 23 and 24, the tube 16 is provided with graduations which indicate the extent to which these inclined ends are inserted within the tube, starting with the zero position at the inner edge of the threaded stem 3 of the cock. A pointer 26 is preferably secured to the member 13 upon which it is adjustable by means of a slot 27 and clamping screws 28 for indicating the point on the tube 16 at which the graduations should be read. The variation of this pointer may be necessary to compensate for tubes and cocks of various lengths.

With this device it is evident not only that the differential pressure can be measured at any distance from the wall of the pipe 1, but also that the Pitot tube can be actually removed or inserted in a pipe in which fluid is flowing without danger of the fluid escaping and without loss of pressure therefrom. The present invention is, therefore, ideal for experimental purposes as the tubes can all be kept clean, and the same Pitot tube can be used in different places where it is freely adjustable without varying the accuracy thereof. Of course, if desired, this tube may be permanently or removably connected to any desired system of piping, and for this purpose a pipe coupling member 29 is shown at the outer end of the tube 16, by means of which it or the pipes 23, 24 are attached in any well-known manner to other corresponding pipes or fittings which lead to a U-tube device 25.

I claim:

1. The combination with a fitting having a threaded stem and a valved bore extending therefrom, a tubular member fitting the bore and insertible through the valve, the bore extending a sufficient distance beyond the valve so that the tubular member can be withdrawn through the valve without removing it from the bore, and means to visibly indicate when the member has been sufficiently withdrawn in the bore to permit the valve to be closed.

2. The combination with a fitting having a valved tubular bore and a threaded stem at one end thereof, a packing gland at the other end of the fitting, a tubular member longitudinally adjustable in the bore, and means for clamping the member in any adjusted position in the fitting.

3. In an adjustable Pitot tube, a fitting having a longitudinal bore with a threaded stem and a valve at one end thereof and a separable portion forming an extension of the bore on the side of the valve opposite the stem, and a tubular member longitudinally adjustable in the bore, the separable extension forming means whereby the tubular member can be withdrawn through the valve without removing it from the bore.

4. An adjustable Pitot tube comprising a fitting with a valved longitudinal bore, a tubular member fitting closely but adjustable in the bore and having a longitudinal scale of graduation, and means in connection with the fitting at one side thereof for indicating the extent to which the member projects from the other side of the fitting by the said graduation.

5. In an adjustable Pitot tube, a graduated tubular member, means comprising a valved fitting in which the member is movable, and a pointer in connection with the fitting for indicating with the said graduations the position of the tubular member in the fitting.

6. The combination with a pipe, of means having a valved bore communicating with the interior of the pipe, a tubular member fitting closely in the bore and insertible therethrough into the pipe, and a packing device at the outer end of said means having a split collar for clamping the tubular member in any adjusted position in said bore.

7. The combination with a pipe, of a cock having a valved straight bore communicating with the pipe, separable means forming an extension of the bore beyond the valve of said cock, a graduated tubular member longitudinally adjustable in the bore having static and dynamic tubes within the confines of the tubular member and insertible through the bore into said pipe, a packing for making a fluid-tight connection around the tubular member comprising a packing gland with a split collar and means for clamping the collar against the tubular member to hold the latter in any adjusted position, and a pointer adjustably mounted upon said means and extending over the packing gland adjacent the surface of the tubular member which is graduated.

In testimony whereof I have signed my name to this specification on this 2d day of July, A. D. 1918.

LESTER F. LOHNES